United States Patent [19]

Kawada

[11] 4,221,411
[45] Sep. 9, 1980

[54] DEVICE FOR PROTECTING A COATING ON DOOR OF AUTOMOBILE

[76] Inventor: Soji Kawada, No. 49-6,5-chome, Nakano, Nakano-ku, Tokyo, Japan

[21] Appl. No.: 915,351

[22] Filed: Jun. 14, 1978

[30] Foreign Application Priority Data

Jun. 15, 1977 [JP] Japan .................................. 52-69954

[51] Int. Cl.² .............................................. B60R 27/00
[52] U.S. Cl. ..................................... 293/118; 296/152
[58] Field of Search ................ 296/146, 152; 293/118, 293/119, 126, 128

[56] References Cited

U.S. PATENT DOCUMENTS

2,678,232  5/1954  Barry ..................................... 293/118

Primary Examiner—Robert R. Song
Attorney, Agent, or Firm—Holman and Stern

[57] ABSTRACT

A device for protecting a coating on door of automobile wherein an operating mechanism provided on a base plate at reverse surface side of a door of automobile is operated by shifting a rod contacting a body of the automobile simultaneous with start of opening operation of the door, and a protector is operated by interlocking with the operating mechanism, and a protector guarding the surface of the coating of outer edge portion of the opening door is caused to project and to turn around the surface side of the edge portion of the opening door thereby protecting the coating on the edge portion of the opening door from the impact or contact with the adjacent parked car or tree or wall or fence and the like, and the protector turns around the reverse surface side of the door by interlocking with the door closing operation and is accommodated inside of the door, so that the protector is not visible from the outside of the automobile which makes this specially equipped automobile look like ordinary automobile.

8 Claims, 22 Drawing Figures

DEVICE FOR PROTECTING A COATING ON DOOR OF AUTOMOBILE

BACKGROUND OF INVENTION

The present invention relates to a device for protecting a coating on automobile, and more particularly to a device for protecting a coating on door of automobile wherein a protector is made to project and turn around an edge portion of an opening door of the automobile by interlocking with opening operation of the door of the automobile thereby protecting the coating on the edge portion of the opening door from the impact or contact with the adjacent parked car, tree, wall or fence and the similar objects and moreover the protector is accommodated in the reverse surface side of the door by interlocking with the closing operation of the door.

Heretofore, when the door of the automobile is opened, the edge portion of the opening door collides with the adjacent parked car, tree, wall or fence and similar objects through the impact or contact thereby scratching the coating of the door which is the drawback of the automobile without equipped with the device according to the present invention.

The present invention has succeeded in solving the conventional problems mentioned above almost completely.

QUALITY, OBJECT AND CONTENT OF INVENTION

An object of the present invention is to provide a device for protecting a coating on a door of automobile which can be accommodated inside of the door in compact form.

Another object of the present invention is to provide a device for protecting a coating on a door of automobile wherein a protector for protecting the coated surface of an edge portion of opening door is made to project and turn around the edge portion by interlocking with an opening and closing operation of the door, and the protector can be accommodated inside of the door.

A further object of the present invention is to provide a device for protecting a coating on a door of automobile wherein with only opening and closing operation of the door, a protector can project and turn around automatically without requiring the other operations, and can be accommodated in the reverse side of the door.

A still further object of the present invention is to protect the coated surface of the edge portion of an opening door from the impact or contact of the edge portion of the opening door with the adjacent parked car, tree, wall, fence and the similar objects by providing a protector interlocking with the opening operation of the door and projects and turns around the edge portion of surface side of the opening door thereby guarding the coated surface of the edge portion of the opening door.

And yet a still further object of the present invention is to provide a device for protecting a coating on a door of automobile wherein a protector turns around the reverse side of the door at the edge portion of the opening door by interlocking with the closing operation of the door and is accommodated inside of the door when the door is closed so that the protector cannot be seen from the outside of the automobile, and during the running of the automobile, its appearance is just like any other cars.

Other objects, features, and advantage of the present invention will be sufficiently obvious from the following description.

DETAILED DESCRIPTION OF INVENTION

The device for protecting a coating on door of automobile according to the present invention comprises an operating mechanism that operates by interlocking with the opening and closing operation of the door and a protector mechanism for projecting a protector P to the edge portion of the opening door D and turning around the surface side of the door D by interlocking with the operating mechanism, and said mechanisms are accommodated in the door which is generally indicated by a letter D.

The present invention is classified into four systems, the wire system, arm system, oil pump system and bevel gear system according to the operating system of the operating mechanism, and also the protector mechanisms are different depending on the difference of the systems. The protector P to be used in each of these systems is formed with a curved surface suitable for guarding the edge portion of the opening door D.

By the way, in the description related to the present invention, the front part or the front portion is meant to be the side of advancing direction of the automobile or the mounting side of the door D to the body B of the automobile, and the rear part or the rear portion is meant to be the side opposite to the advancing direction of the automobile or the side of the edge of the opening door D.

Now, the description of the first wire system will be provided, wherein an embodiment of this system is illustrated in FIG. 2 to FIG. 7, and an operating mechanism and protector mechanism are mounted on a base plate (1) fixed to the inside of the door D so that the protector P projects over the side of the edge portion of the opening door D when the door D is opened and turns around the surface side of the door D, and when the door D is closed, and the protector P is rotatably accommodated in the reverse surface side of the door D. The operating mechanism of this system transmits the motion of the rod moving back and forth by interlocking with the opening and closing operation of the door to the protector mechanism by means of the wire.

Figure 1:
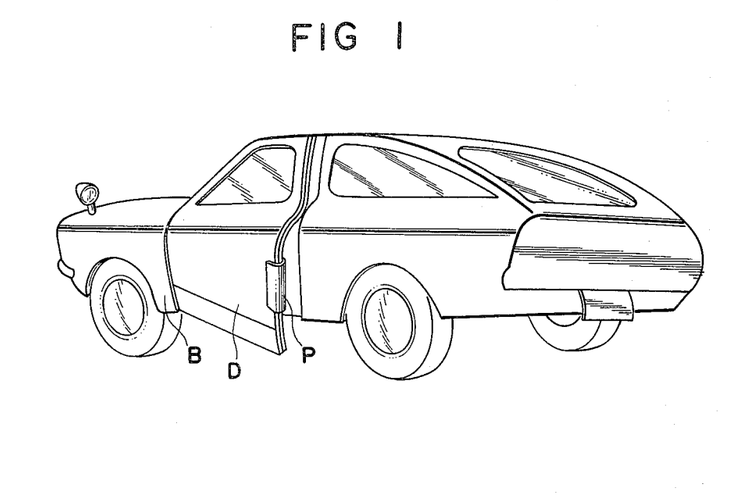
FIG. 1 is a perspective view of automobile on which the device of the present invention is equipped.
Figure 2:
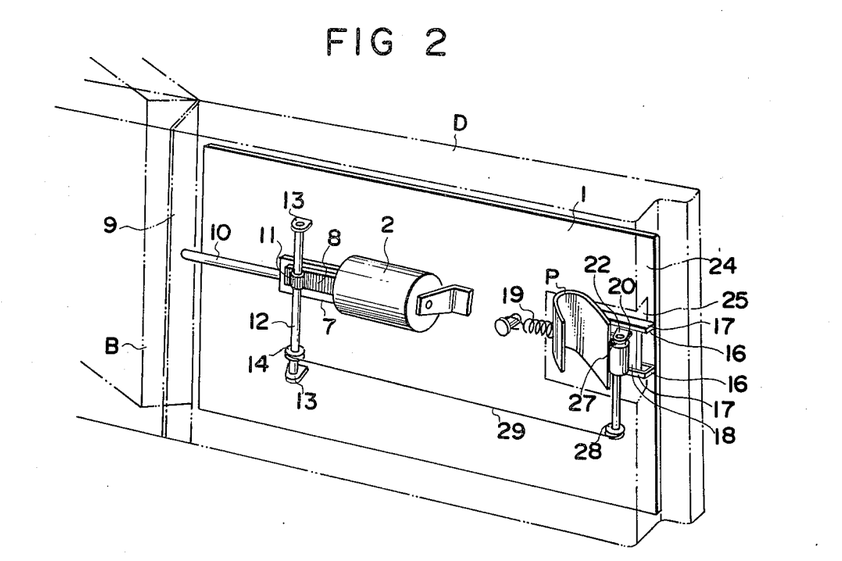
FIG. 2 is a perspective view of the entire part of the device in wire system.

On the base plate (1), a holding cylinder (2) opening in the forward is fixed, and a projection (3) is provided toward the inside of the opening portion of the holding cylinder (2), and one end of a push spring (5) is fixed to a rear plate (4) in the holding cylinder (2), and furthermore, an operating plate (7) provided with a projection (6) serving as a stopper by contacting the projection (3) of the holding cylinder (2) on the rear end portion is fitted into the holding cylinder (2) so as to move back and forth, and the other end of the push spring (5) is fixed to the rear end surface of the projection (6), and the force of shifting the operating plate (7) toward the front side by the push spring (5) is applied. A rack (8) is provided on the operating plate (7), and a rod (10) projecting the forward through the contact with the body B of the automobile that runs through a side plate (9) of the front side of the door D is projected on the front end of the operating plate (7). A shaft (12) fixed with a pinion (11) meshed with the rack (8) is rotatably inserted to bearing plates (13), (13) provided on the base plate (1), and the shaft (12) is fixed with a pulley (14). Two pieces of rails (17) and (17) having stoppers (15), (16) are vertically provided in opposition at the front and rear ends on the rear end portion of the base plate (1), and a slide plate (18) is inserted into the rails (17), (17), and the slide plate (18) is made to slide back and forth along the rails (17), (17), and one end of push spring (19) is fixed to the base plate (1), and the other end is fixed to the front end surface of the slide plate (18), and the force of shifting the slide plate (18) in rear side is applied by the push spring (19) whereby the operating mechanism is constituted.

The protector mechanism is extended outwards from the mounting portions (20), (20') of the protector P, and rotating shafts (21), (21') formed an integral part with the mounting portions (20), (20') as they are fixed are rotatably journalled on bearing plates (22), (22') provided on the slide plate (18), and a shaft (23) is fixed between the mounting portions (20), (20'), and the protector P is made to shift to the side of the edge portion of the opening door D together with the slide plate (18), and then the protector P is caused to project and turn from the opening portion (25) of the side plate (24) of the rear portion of the door D and a push spring (26) for guarding the edge portion of the opening door D is loosely fitted to the shaft (23), and one end of this push spring (26) is fixed to the slide plate (18), and the other end is hooked to the reverse surface of the protector P and the force of turning the protector P to the surface side of the edge portion of the opening door D is applied. A stopper (27) is provided on the mounting portion (20) of the protector P so as to project slightly from the bearing plate (22), and the turning motion of the protector P in both directions of back and forth is stopped at this position as the stopper (27) contacts either side of the front and back of the bearing plate (22). Moreover, a pulley (28) is fixed to one end of the rotary shaft (21'), and between this pulley (28) and the pulley (14) of the operating mechanism, a wire (29) is spanned, and both ends of the wire (29) are fixed to each pulley (14) and (28), whereby the protector mechanism is constituted.

The pressing strength of the push springs (5), (19), (26) are preferably set at 3:2:1.

Figure 3:
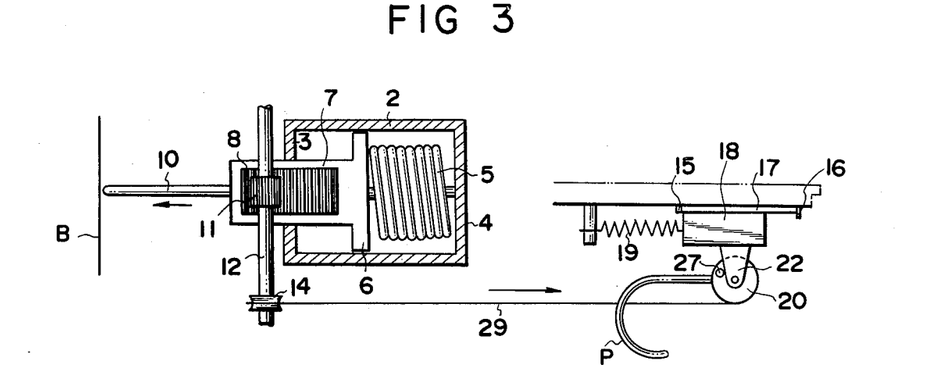
FIG. 3 is an explanatory drawing whose part is cut away to show an operating mechanism of the wire system and a protector mechanism at the door closing time.

However, the description of the operation of this wire system will be provided as follows. In case the door D is completely closed, and while the automobile travels, as shown in FIG. 3, the tip of the rod (10) is caused to pressure contact the body B of the automobile, and therefore the operating plate (7) is positioned to the side of the rear plate (4) of the holding cylinder (2) by resisting to the push spring (5), and accordingly, the shaft (12) fixed with the pinion (11) meshing with the rack (8) is not rotated, and the wire (29) is strongly pulled toward the side of the pulley (14), and in this condition, the rotation of the pulley (28) is stopped, and the slide plate (18) contacts the front stoppers (15), (15) of the rails (17), (17) by resisting to the push spring (19) and is positioned so that the protector P is not allowed to turn toward the surface side of the edge portion of the opening door D, and remains to be accommodated in the reverse surface side of the door D.

Figure 4:
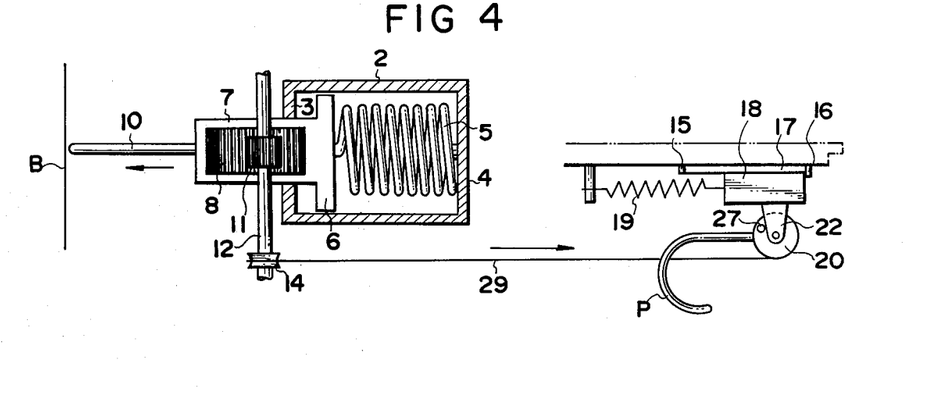
FIG. 4 is an explanatory drawing whose part is cut away to show an operating mechanism and protector mechanism on the way to its opening motion of the door in the wire system.
Figure 5:
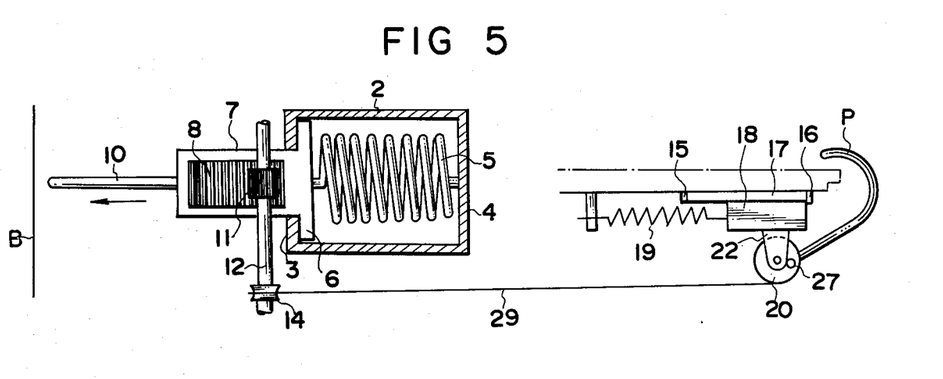
FIG. 5 is an explanatory drawing whose part is cut away to show an operating mechanism and protector mechanism when the door is opened and the protector projects and turns around the surface side of an edge portion of the opening door in the wire system.
Figure 6:
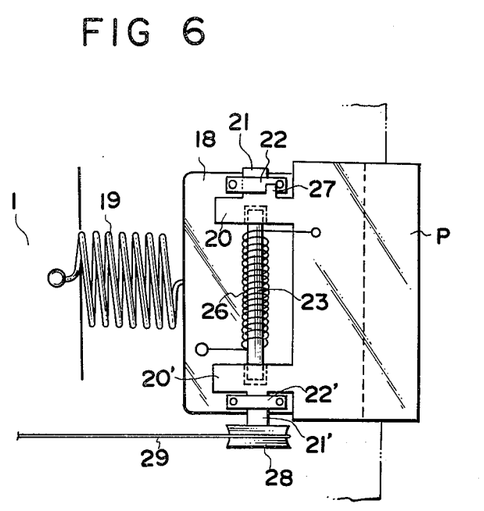
FIG. 6 is an elevation showing the protector in projecting and turning around the surface side of the edge portion of the opening door in the wire system.
Figure 7:
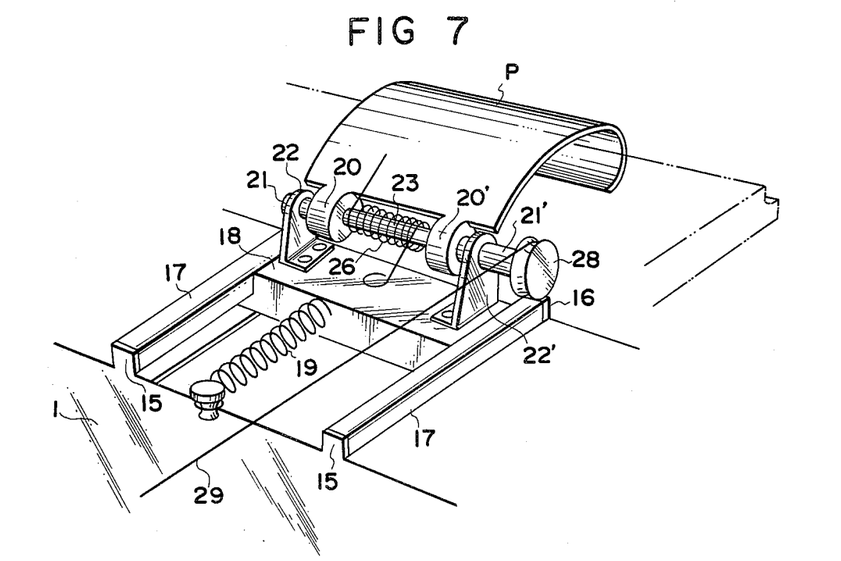
FIG. 7 is a perspective view of the protector mechanism of FIG. 6.

Next, in case the door D is on the way to its opening, as shown in FIG. 4, when the opening operation of the door D is carried out, the pressing force of the tip of the rod (10) on the body B of the automobile becomes weakened, and when the push spring (5) gradually exhibits its resilient force to push the operating plate (7) forward, the pinion (11) meshed with the rack (8) turns backward, and accordingly, the shaft (12) and the pulley (14) are rotated, and the wire (29) gradually starts to loose, and the tensile force of the pulley (28) by the wire (29) is weakened, and simultaneously, the push spring (19) starts to push the slide plate (18) backward. When the door D is opened farther than the position indicated in FIG. 4, the contact condition of the tip of the rod (10) on the body B of the automobile is completely released as shown in FIG. 5-7, and the operating plate (7) shifts forward until the projection (6) contacts the projection (3) of the holding cylinder (2) by means of the push spring (5), and rotates together with the pinion (11) meshed with the rack (8), and then, accordingly, the shaft (12) and the pulley rotate, and the wire (29) becomes further loosened, and when the tensile force of the pulley (28) by the wire (29) totally disappears, the slide plate (18) contacts the stoppers (16), (16) of the rails (17), (17) completely by means of the push spring (19), and stops. At the same time, the push spring (26) of the protector D whose pushing strength is the weakest works finally, and the protector P turns around the surface side of the edge portion of the opening door D through the opening portion (25) of the side plate (24) of the rear portion of the door D, and the stopper (27) contacts the side of the rear portion of the bearing plate (22) and stops, and the curved surface of the protector P covers the surface of the edge portion of the opening door D.

Furthermore, the operation of closing the door D will be described as follows. When the tip of the rod (10) contacts the body B of the automobile by the closing operation of the door D, the operating plate (7) shifts in the direction of the rear plate (4) in the holding cylinder (2) by resisting to the push spring (5), and the shaft (12) fixed with the pinion (11) meshed with the rack (8) turns forward, and when the wire (29) is wound and drawn towards the side of the pulley (14) gradually by means of the pulley (14), the pulley (28) is rotated by resisting to the push spring (26) of the protector P whose pushing strength is the weakest, and the protector P connected to the rotating shafts (21), (21') turns around the reverse surface side of the door D for the first time through the opening portion (25), and the stopper (27) contacts the side of the front portion of the bearing plate (22) to stop the turning of the protector P, and at the same time, the rotation of the pulley (28) stops, and the pulley (28) is drawn in the forward direction together with the slide plate (18). Furthermore, when the door D is closed, the operating plate (7) shifts in the direction of the rear plate (4) in the holding cylinder (2), and the slide plate (18) contacts the front stoppers (15), (15) of the rails (17), (17) and stops, and the accommodating operation of the protector P is completed.

Figure 8:
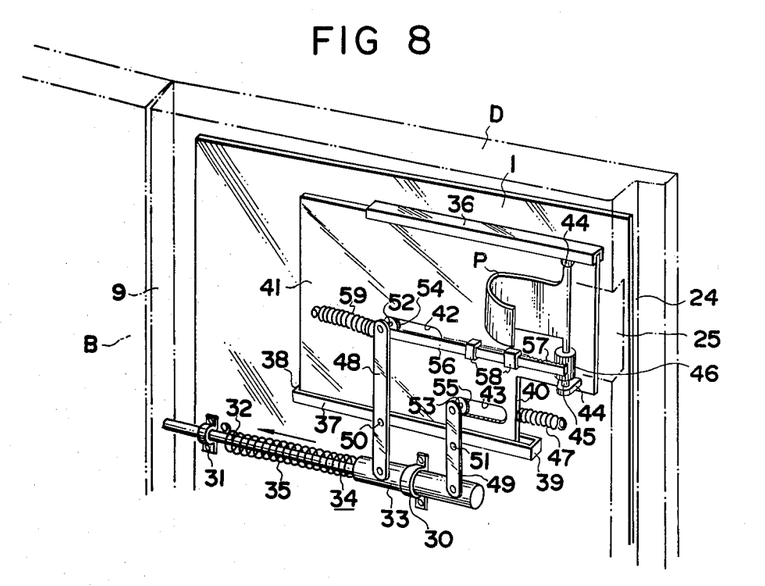
FIG. 8 is a perspective view of the entire device when the door is closed in the arm system.
Figure 9:
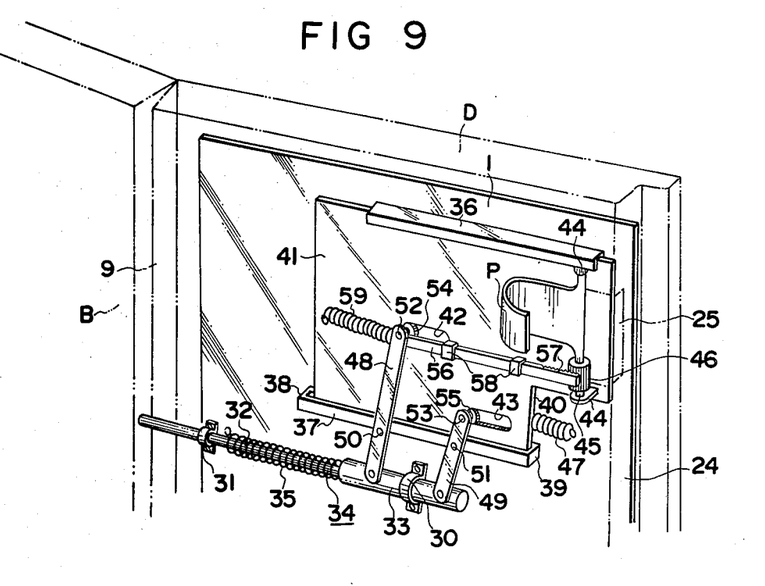
FIG. 9 is a perspective view of the entire device when the door is on the way to its opening in the arm system.
Figure 10:
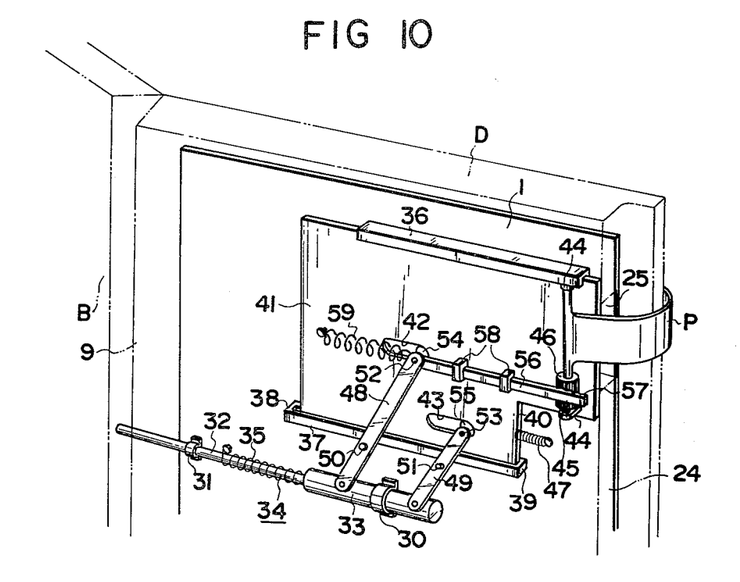
FIG. 10 is a perspective view of the entire device when the door is opened and the protector projects and turns around the surface side of the edge portion of the opening door in the arm system.

The second system, namely, the arm system will be described as follows. An embodiment according to this sytem is shown in FIG. 8 to FIG. 10, and the operating mechanism and the protector mechanism for projecting the protector P over the edge portion of the opening door D when the door D is opened, and turning the protector P around the surface side of the door D and accommodating the protector P in the reverse surface side of the door D when the door D is closed are mounted on the base plate (1) fixed inside of the door D. The operating mechanism of this system transmits the movement of the rod moving back and forth by interlocking with the opening and closing of the door to the protector mechanism through the arm.

The tip portion of a rod (34) formed by connecting a small diameter shaft (32) and a large diameter shaft (33) is made to project forward through the side plate (9) of the front side of the door D and to contact the body B of the automobile, and the large diameter shaft (33) and small diameter shaft (32) of the rod (34) are inserted into the large and small bearings (30), (31) provided in the lower part of the base plate (1) to allow the rod (34) to move back and forth. A pull spring (35) is loosely fitted into the small diameter shaft (32), and one end of the pull spring (35) is fixed to the base plate (1), and the other end is fixed to the end portion of the large diameter shaft (33), and the force of shifting to the front side of the door D is applied to the rod (34) by means of the pull spring (35). On the upper part of the rod (34), rails (36), (37) are vertically installed, and in the front and back of the lower rail (37), stoppers (38), (39) are provided, and the upper rail (36) is provided by being displaced in the rear side of the door D from the lower rail (37), and on the rails (36), (37), a slide plate (41) having a notched portion (40) is inserted, and are arranged to move back and forth along the rails (36), (37). In the vicinity of the center of the slide plate (41) and notched portion (40), long holes (42), (43) having the same length are formed, and a shaft (45) is rotatably journalled on the bearing plates (44), (44) provided at the rear portion of the slide plate (41), and the protector P and a pinion (46) are fixed to this shaft (45). Furthermore, one end of the pull spring (47) is fixed to the base plate (1), and the other end is fixed to the notched portion (40) of the slide plate (41), and the force of shifting the slide plate (41) in the rear direction is applied to the slide plate (41) by means of the pull spring (47). The lower portion of arms (48), (49) whose upper portions reach the long holes (42), (43) are rotatably journalled on the large diameter shaft (33) of the rod (34), and middle portions of the arms (48), (49) are journalled on the shafts (50), (51) provided on the base plate (1), and the arms (48), (49) are adapted to turn centering around the shafts (50), (51) are fulcrums. On the upper portions of the arms (48), (49), the pins (52), (53) run through the long holes (42), (43) and are loosely fitted, and plates (54), (55) whose diameter is larger than that of the long holes (42), (43) are fixed to the lower ends of the pins (52), (53), and the arms (48), (49) can move back and forth without being disengaged along the long holes (42), (43) through the pins (52), (53), whereby the operating mechanism is constituted.

The protector mechanism is so constituted that a tip of the arm (56) whose rear portion reaches the pinion (46) is loosely fitted to the pin (52) of the arm (48), and a rack (57) meshed with the pinion (46) is provided at the rear portion of the arm (56), and the middle portion of the arm (56) is journalled on the bearings (58), (58), assuring the arm (56) to move back and force in right angles to the shaft (45), and then the arm (56) retreats and the protector P projects from the opening portion (25) of the side plate (24) of the rear side of the door D, and the protector P turns around the surface side of the edge portion of the opening door D to cover the edge portion surface of the opening door D, and one end of the pull spring (59) is fixed to the slide plate (41), and the other end is fixed to the upper portion of the arm (48), and the force of s shifting the upper portion of the arm (48) to the front side of the door D is applied by the pull spring (59).

The tensile strength of the pull springs (35), (47), (59) is preferably set at 3:2:1.

However, the operation of the arm system will be described as follows. In case the door D is completely closed during the traveling of the automobile, the tip of the rod (34) is in pressure contact with the body B of the automobile as shown in FIG. 8, the rod (34) is positioned at the rear side of the door D by resisting to the pull spring (35), and the arms (48), (49) whose lower portions are journalled rotatably on the rod (34) are almost erected upright, and the pins (52), (53) on the upper parts of the arms (48), (49) are positioned at the front end portions of the long holes (42), (43), and the slide plate (41) contacts the front stopper (38) of the lower rails (37) and stops, and the arm (56) is pulled toward the front portion of the door D by means of the pull spring (59), so that the pinion (46) is not turned by the rack (57) of the rear portion of the arm (56), and the protector P is not projected and turned around and is accommodated in the door D.

Next, in case the door D is on the way to its opening, the pressing force of the contact of the tip of the rod (34) on the body B of the automobile becomes weakened according to the opening operation of the door D as shown in FIG. 9, and when the rod (34) is pulled and shifted toward the front side of the door D gradually by the pull spring (35), the upper pins (52), (53) of the arms (48), (49) contact the front end surfaces of the long holes (42), (43), and the slide plate (41) is drawn and shifted backward by means of the pull spring (47), and the slide plate (41) contacts the rear stopper (39) of the lower rail (37) and stops.

When the door D is opened, the tip of the rod (34) is completely released from the contacting condition with the body B of the automobile, as shown in FIG. 10, and the rod (34) is shifted to the front side of the door D by the pull spring (35), and the upper part of the arm (48) is shifted in the rear part in the long hole (42) by resisting to the pull spring (59), and the upper part of the arm (49) is shifted in the rear part in the long hole (43) by means of the pin (53), and the pins (52), (53) of the arms (48), (49) contact the rear end surface of the long holes (42), (43) and stop. In the meantime, the arm (56) is shifted in the rear part according to the arm (48), and the pinion (46) is caused to turn in the forward direction by means of the rack (57), and the protector P is caused to turn around the surface side of the edge portion of the opening door D through the opening portion (25) of the side plate (24) of the rear portion of the door D, and the curved surface of the protector P covers the end surface of the opening door D.

Furthermore, the closing operation of the door D will be described as follows. The tip of the rod (34) contacts the body B of the automobile by the closing operation of the door D, and the rod (34) is shifted in the rear part of the door D by resisting to the pull spring (35), the upper portion of the arm (48) is drawn by the pull spring (59), and is made to shift in the front direction in the long hole (42) by means of the pin (52), and the upper portion of the arm (49) is shifted in the front direction in the long hole (43) by means of the pin (53), and the pins (52), (53) of the arms (48), contact the front end surfaces of the long holes (42), (43) and stop, and accordingly, the arm (56) is shifted in the front direction, and the pinion (46) is caused to turn backward by the rack (57), and the protector P is caused to turn around the reverse surface side of the door D through the opening portion (25). When the rod (34) is further shifted in the front direction, the arms (48), (49) are shifted accordingly, and the pins (52), (53) of the arms (48), (49) remain contacting with the front end surfaces of the long holes (42), (43), and the slide plate (41) is caused to shift in the front direction by resisting to the pull spring (47), and contacts the front stopper (38) of the lower rail (37) and stops, and the accommodating operation of the protector P is completed.

The description about the third oil pump system will be provided as follows. An embodiment according to this system is shown in FIG. 11 to FIG. 16, and the operating mechanism and protector mechanism for projecting the protector P over the side of the edge portion of the opening door D when the door D is opened, and turning the protector P around the surface side of the door D on the reverse surface side of the door D and housing it when the door D is closed are mounted on the base plate (1) fixed in the door D. The operating mechanism of this system operates the oil pump by the reciprocating motion of the rod moving back and forth by interlocking with the opening and closing of the door, and transmitting the motion of the protector mechanism by the arm interlocking with the oil pump.

Figure 11:
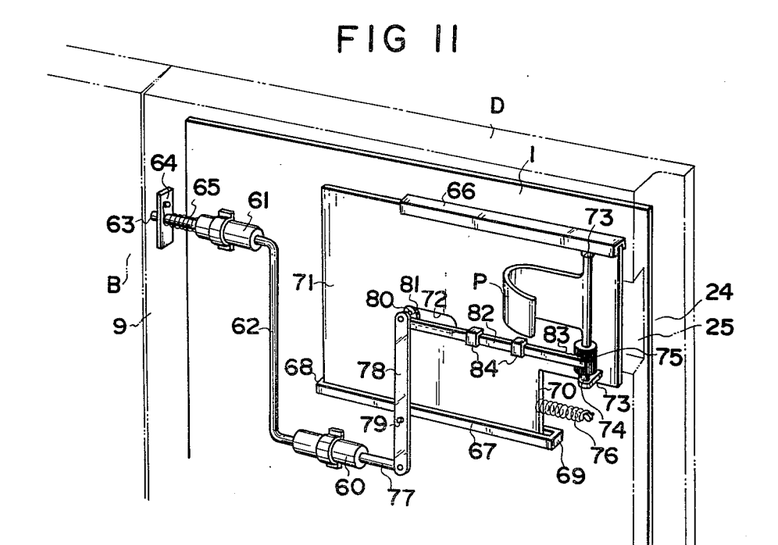
FIG. 11 is a perspective view of the entire device when the door is closed in the oil pump system.
Figure 12:
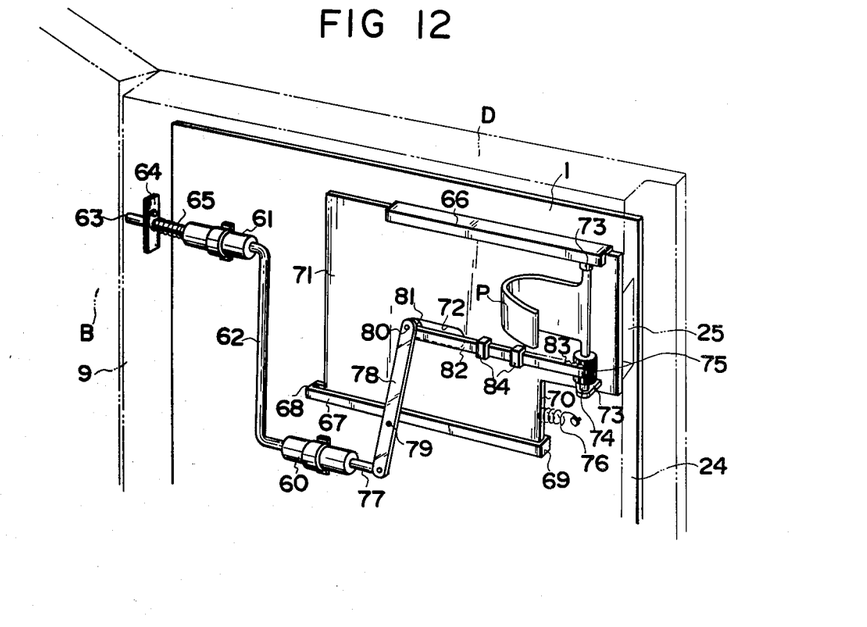
FIG. 12 is a perspective view of the entire device when the door is on the way to its opening in the oil pump system.
Figure 13:
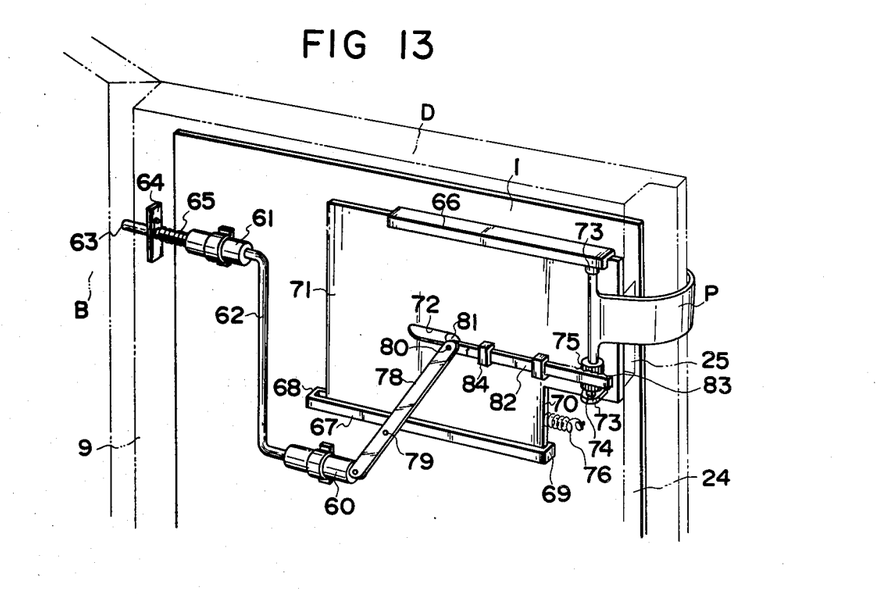
FIG. 13 is a perspective view of the entire device when the door is opened and the protector projects and turns around the surface side of the edge portion of the opening door.
Figure 14:
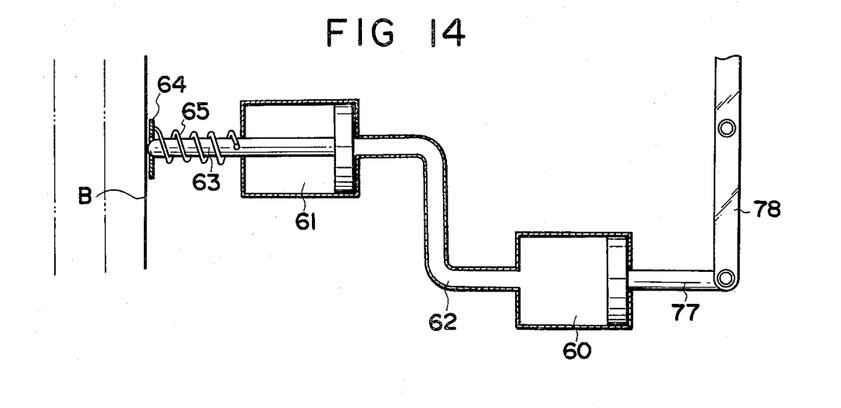
FIG. 14 is an explanatory drawing showing the operating condition of the oil pump and the arm when the door is closed in the oil pump system.
Figure 15:
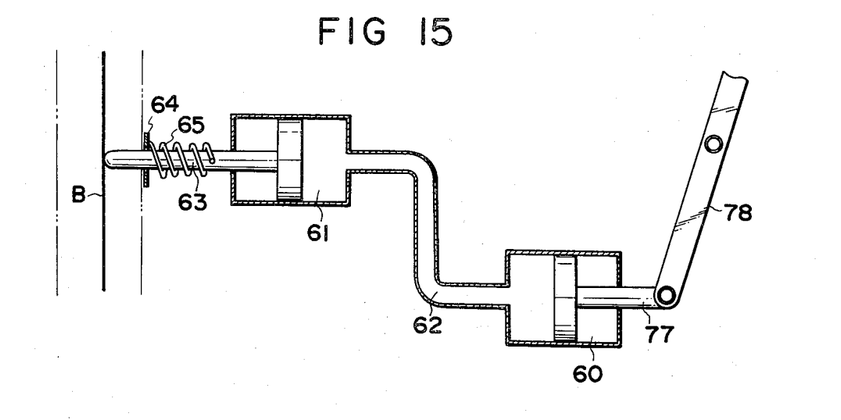
FIG. 15 is an explanatory drawing showing the operating condition of the oil pump and the arm when the door is on the way to its opening in the oil pump system.

The oil pumps (60), (61) are fixed to the base plate (1), and the oil pumps (60), (61) are connected by means of an oil hose (62), and a rod (63) of the oil pump (61) is caused to project in the front part by running through a plate (64) and the side plate (9) of the front side of the door D and contacts the body B of the automobile, and a pull spring (65) is loosely fitted to the rod (63), and one end of a pull spring (65) is fixed to the plate (64), and the other end is fixed to the rod (63), and the force of shifting the rod (63) in the front direction of the door D is applied by the pull spring (65). On the upper part of the oil pump (60), rails (66), (67) are vertically installed, and stoppers (68), (69) are provided in the front and back of the lower rail (67), and the upper rail (66) is displaced to the rear side of the door D by the lower rail (67), and a slide plate (71) having a notched portion (70) is loosely inserted to the rails (66), (67), and is adapted to moving back and forth along the rails (66), (67). In the center of the slide plate (71), a long hole (72) is formed, and also, in the rear part of the slide plate (71), bearing plates (73), (73) are provided, and a shaft (74) is rotatably journalled on the bearing plates (73), (73), and the protector P and pinion (75) are fixed to the shaft (74). Moreover, one end of a pull spring (76) is fixed to the base plate (1), and the other end is fixed to the notched portion (7) of the slide plate (71), and the force for shifting the slide plate (71) in the rear direction is applied by the pull spring (76). The lower portion of an arm (78) whose upper portion reaches the long hole (72) is rotatably journalled on the rod (77) of the oil pump (60), and the middle portion of the arm (78) is journalled on a shaft (79) provided on the slide plate (71), and the arm (78) is adapted to turn centering around this shaft (79) as fulcrum. Furthermore, a pin (80) runs through the long hole (72) and is fixed to the upper portion of the arm (78), and a plate (81) whose diameter is larger than the long hole (72) is fixed to the lower end of the pin (80), and the arm (78) is adapted to move back and forth without disengagement along the long hole (72)

through the pin (80), whereby the operating mechanism is constituted.

The protector mechanism is so constituted that the tip portion of an arm (82) whose rear portion reaches the pinion (75) is loosely fitted to the pin (80) of the arm (78), and a rack (83) meshed with the pinion (75) is provided on the rear portion of the arm (82), and also the middle portion of the arm (82) is supported on the bearings (84), (84).

The arm (84) is adapted to move back and forth in right angles to the shaft (74) positively, and the arm (82) retreats, and the protector P projects over the opening portion (25) of the side plate (24) of the rear side of the door D, and the protector P is turned around the surface side of the edge portion of the opening door D to cover the edge surface of the opening door D.

However, the operation of this oil pump system will be described as follows. In case the door D is completely closed during the running of the automobile, the tip of the rod (63) of the oil pump (61) contacts the body B of the automobile under pressure as shown in FIG. 11 to FIG. 14, so that the rod (63) is positioned in the rear side of the door D by resisting to the pull spring (65), and accordingly, the rod (77) of the oil pump (60) is positioned in the rear side of the door D, and the arm (78) journalled on the rod (77) is erected almost upright, and the upper pin (80) of the arm (78) is positioned at the tip portion of the long hole (72), and the slide plate (71) contacts the front stopper (68) of the lower rail (67), and as the arm (82) is pulled toward the front side of the door D, the pinion (75) is not turned by the rack (83) of the rear portion of the arm (82), and also the protector P is not turned around the surface side of the edge portion of the opening door D and is housed in the reverse surface side of the door D.

Next, in case the door D is on the way to its opening, the pressing force of the tip of the rod (63) of the oil pump (61) on the body B of the automobile is weakened according to the opening operation of the door D as shown in FIG. 12 to FIG. 15, and when the rod (63) is pulled and shifted toward the front side of the door D gradually by the pull spring (65), the rod (77) of the oil pump (60) is shifted to the front side of the door D, and while the upper pin (80) of the arm (78) journalled on the rod (77) contacts the front end surface of the long hole (72), the slide plate (71) is drawn and shifted toward the rear part by the pull spring (76), and the slide plate (71) contacts the rear stopper (69) of the lower rail (67) and stops.

When the door D is opened, the tip of the rod (63) of the oil pump (61) is released completely from the contacting condition with the body B of the automobile as shown in FIG. 13 through FIG. 16, and the rod (63) is shifted in the front side of the door D by the pull spring (65), and the upper portion of the arm (78) journalled on the rod (77) is shifted in the rear part through the long hole (72) by means of the pin (80), and the pin (80) of the arm (78) contacts the rear end surface of the long hole (72) and stops. In the meantime, the arm (82) follows the arm (78) in the rear part, and the pinion (75) is turned forward by the rack (83) and the protector P is turned around the surface side of the edge portion of the opening door D through the opening portion (25) of the side plate (24) of the rear side of the door D, and the curved surface of the protector P covers the end portion surface of the opening door D.

Figure 16:
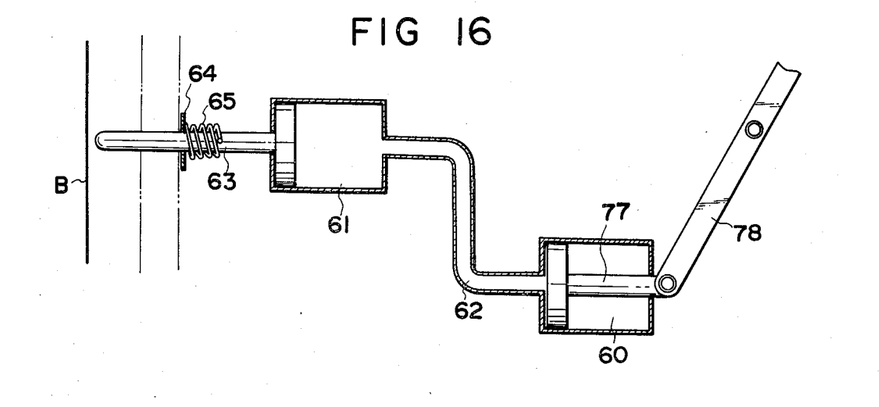
FIG. 16 is an explanatory drawing showing the operating condition of the oil pump and the arm when the door is opened and the protector projects and turns around the surface side of the edge portion of the opening door in the oil pump system.

Furthermore, the operation of the closing of the door will be described as follows. The tip of the rod (63) of the oil pump (61) contacts the body B of the automobile by the closing operation of the door D, and when the rod (63) is shifted in the rear part of the door D by resisting to the pull spring (65), the rod (77) of the oil pump (60) is shifted to the rear side of the door D accordingly, and the upper portion of the arm (78) is journalled on the rod (77) is shifted forward through the long hole (72) by means of the pin (80), and the pin (80) of the arm (78) contacts the front end surface of the long hole (72) and stops, and accordingly, the arm (82) is shifted forward, and the pinion (75) is turned in the rear part by the rack (83), and the protector P is caused to turn around the reverse side of the door D through the opening portion (25). When the rod (63) of the oil pump (61) is shifted in the rear part, the rod (77) of the oil pump (60) is shifted in the rear part of the door D, in while the pin (80) of the arm (78) contacts the front end surface of the long hole (72), the slide plate (71) is shifted forward by resisting to the pull spring (76), and contacts the front stopper (68) of the lower rail (67) and stops whereby the accommodating operation of the protector P is completed.

The description of the fourth bevel gear system will be provided as follows. An embodiment of this system is shown in FIG. 17 through FIG. 22, and an operating mechanism and protector mechanism for projecting the protector P over the edge portion of the opening door D when the door D is opened, and is caused to turn around the surface side of the door D, and turning the protector P around the reverse side of the door D and accommodating the protector P therein when the door D is closed are mounted on the base plate (1) fixed inside of the door D.

Figure 17:
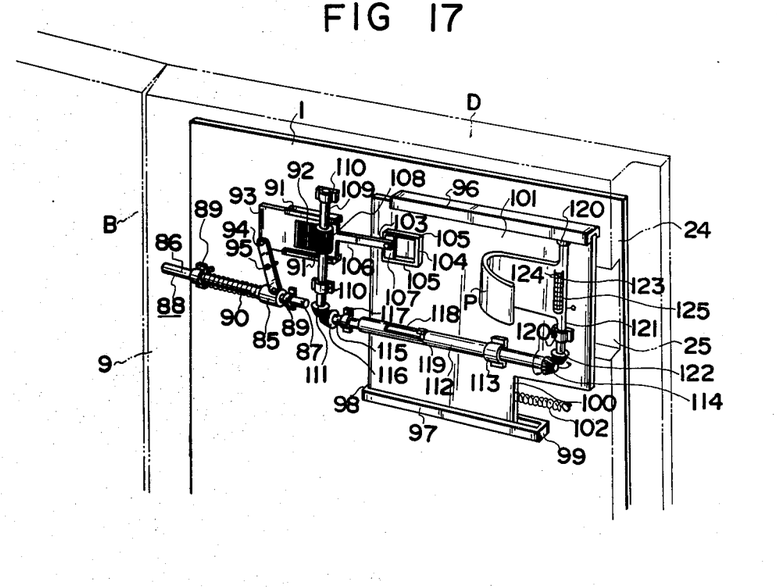
FIG. 17 is a perspective view of the entire device when the door is closed in the bevel gear system.

The operating mechanism of this system transmits the movement of the rod interlocking with the opening and closing of the door D to the protector mechanism by means of the bevel gear.

The tip portion of a rod (88) formed by connecting a large diameter shaft (85) in its center and a long small diameter shaft (86) and short small diameter shaft (87) at its front and back projects the front portions through the side plate (9) of the front side of the door D and contacts the body B of the automobile, and the long small diameter shaft (86) and short small diameter shaft (87) of the rod are fitted and journalled on bearings (89), (89) provided on the base plate(1), whereby the rod (88) is movable back and forth. A pull spring (90) is loosely fitted on the long small diameter shaft (86), and one end of the pull spring (90) is fixed to the base plate (1), and the other end is fixed to the large diameter shaft (85), and the force for shifting the rod (88) in the front side of the door D is applied by the pull spring (90). On the upper part of the rod (88), rails (91), (91) are vertically installed in opposition, and an operating plate (93) provided with a rack (92) is inserted in the rails (91), (91) so as to move back and forth, and this operating plate (93) and the large diameter shaft (85) of the rod (88) are connected by an arm (94), and the center portion of the arm (94) is journalled on the base plate (1) by means of the shaft (95), and the upper and lower portions of the arm (94) are adapted to turn according to the forward and backward movement of the rod (88) centering around this shaft (95), and in the rear part of the base plate (1), rails (96), (97) are vertically installed in opposition, and in the front and back of the lower rail (97), stoppers (98), (99) are provided, and the upper rail (96) is displaced toward the rear side as compared with the lower rail (97). A slide plate (101) having a notched portion (100) is inserted into the rails (96), (97), and is adapted to move back and forth along the rails (96), (97). Furthermore, one end of a pull spring (102) is fixed to the base plate (1), and the other end is fixed to the notched portion (100) of the slide plate (101), and the force for shifting the slide plate (101) in the rear side is applied by a pull spring (102). Rails (105), (105) having stoppers (103), (104) at front and back are vertically installed in the upper part of the front of the slide plate (101), and a small slide plate (107) journalled on the rear portion of a thin member (106) extended and projected in the rear part from the operating plate (93) is inserted into the rails (105), (105). This small slide plate (107) is adapted to move back and forth along the rails (105), (105) according to the forward and backward movement of the operating plate (93). A shaft (109) fixed with a pinion (108) meshed with the rack (92) is journalled rotatably on bearings (110), (110) provided on the base plate (1), and a bevel gear (111) is fixed to the lower end of the shaft (109), and in the lower part of the slide plate (101), a cylinder (112) is journalled rotatably on a bearing (113) provided on the slide plate (101), and a bevel gear (114) is fixed to the rear end of the cylinder (112), and a shaft (115) is rotatably inserted from the tip of the cylinder (112), and a bevel gear (116) meshed with a bevel gear (111) is fixed to the tip of the shaft (115), and the shaft (115) is rotatably supported on a bearing (117) provided on the base plate (1), and the shaft (115) is interlocked with the rotation of the bevel gear (111) through the bevel gear (116) and is turned. Furthermore, an opening portion (118) is formed on the cylinder (112), and a part of the shaft inserted into the cylinder (112) is exposed, and a stopper (119) is projected on the exposed portion of the shaft (115), and the forward and backward movement of the shaft (115) is controlled as the stopper (119) contacts the front and rear end surfaces of the opening portion (118), and the rotation of the shaft (115) is controlled as the stopper (119) contacts the upper and lower end surfaces of the opening portion (118).

The protector mechanism is so constituted that a shaft (121) of the protector P is rotatably journalled on bearings (120), (120) provided at the rear part of the slide plate (101), and a bevel gear (122) meshed with the bevel gear (114) is fixed to the lower end of the shaft (121), and a small shaft (124) is fixed to a concave portion (123) formed in the center of the shaft (121) and a push spring (125) is loosely fitted on this small shaft (124), and its one end is fixed to the slide plate (101) and the other end is engaged with the inner surface of the protector P to stop the turning of the protector P in the rear part. After the protector P is once turned in the rear part, when the door D starts its closing operation, the push spring (125) is operated, and the protector P is caused to turn around and is accommodated in the reverse surface side of the door D, and the bevel gears (122), (114) are turned by the pressing force of the push spring (125), and accordingly, the cylinder (112) is adapted to turn upwardly.

Figure 20:
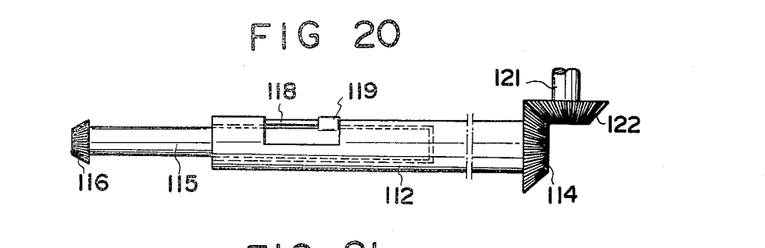
FIG. 20 is an enlarged elevation showing the operating condition of the cylinder and the shaft when the door is closed in the bevel gear system.

However, the operation of the bevel gear system will be described as follows. In case the door D is completely closed during the running of the automobile, the tip of the rod (88) contacts the body B of the automobile under pressure as shown in FIG. 17, so that the rod (88) is positioned at the rear side of the door D by resisting to the pull spring (90), and the operating plate (93) and small slide plate (107) are positioned in the front side of the door D, and the slide plate (101) contacts the front stopper (98) of the lower rail (97), and as the stopper (119) of the shaft (115) contacts the upper surface of the rear end of the opening portion (118) as shown in FIG. 20, the bevel gear (114) is not turned, and accordingly, the bevel gear (122) is not turned, and the protector P is not turned around the surface side of the edge portion of the opening door D and is accommodated in the reverse surface side of the door D.

Figure 18:
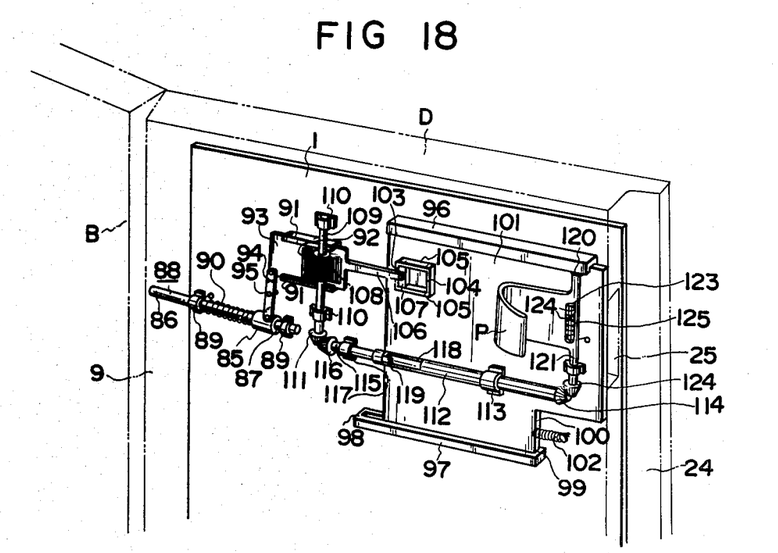
FIG. 18 is a perspective view of the entire device when the door is on the way to its opening in the bevel gear syetem.
Figure 21:
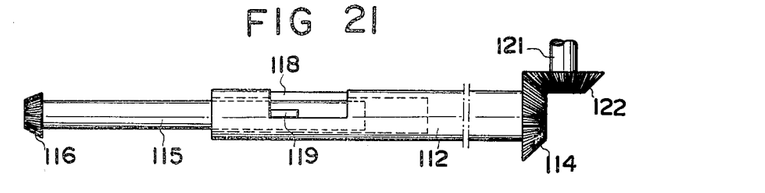
FIG. 21 is an enlarged elevation showing the operating condition of the cylinder and the shaft when the door is on the way to its opening in the bevel gear system.

Next, in case the door D is on the way to its opening, the pressing force of the tip of the rod (88) on the body B of the automobile becomes weakened according to the opening operation of the door D as shown in FIG. 18, and when the rod (88) is drawn and is shifted gradually toward the front of the door D by the pull spring (90), the arm (94) becomes erected almost in upright condition, and the operating plate (93) is caused to shift backward by means of the rails (91), (91). As a result, the pressing force of the small slide plate (107) against the front stopper (103) becomes weakened, and the slide plate (101) is drawn backward by the pull spring (102), and is shifted backward by means of the rails (96), (97), and contacts the rear stopper (99) and stops, and then the cylinder (112) is shifted backward, and the stopper (119) of the shaft (115) contacts the front end surface of the opening portion (118) and stops. On the other hand, the pinion (108) is turned in the front side by the backward shaft of the operating plate (93), and the bevel gear (111) is turned in the arrow mark direction, and accordingly, the bevel gear (116) is turned in the arrow mark direction, and the shaft (115) is turned downwardly, and the stopper (119) of the shaft (115) contacts the lower surface of the front end portion of the opening portion (118) of the cylinder (112) as shown in FIG. 21, and stops.

Figure 19:
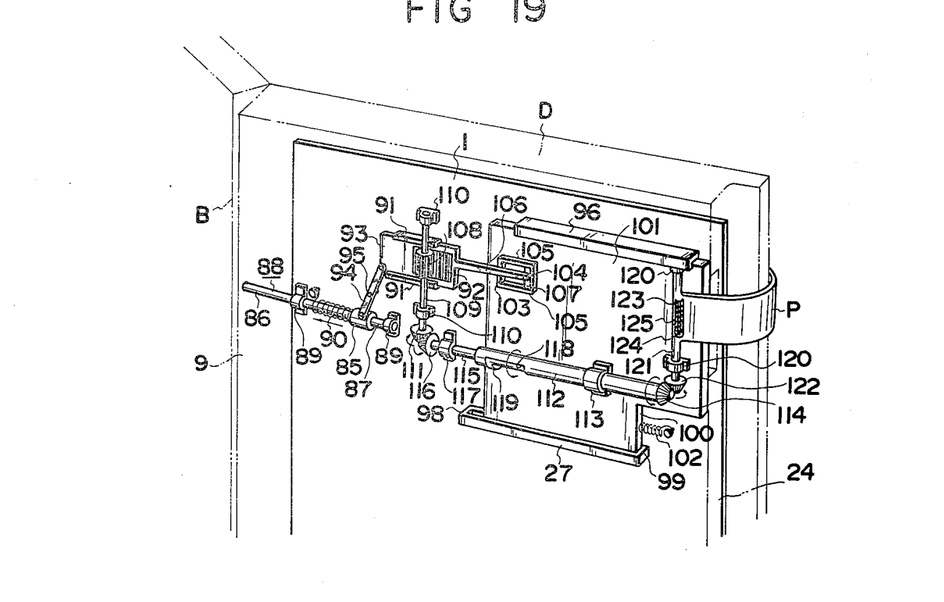
FIG. 19 is a perspective view of the entire device when the door is opened and the protector projects and turns around the surface side of the edge portion of the opening door in the bevel gear system.
Figure 22:
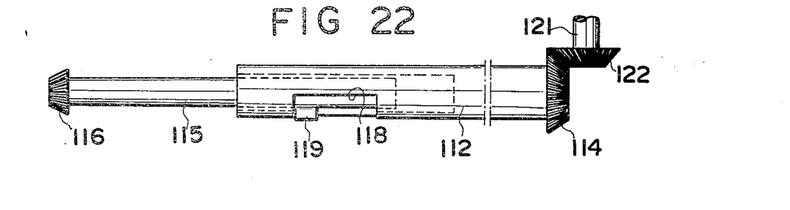
FIG. 22 is an enlarged elevation showing the operating condition of the cylinder and the shaft when the door is opened and the protector projects and turns around the surface side of the edge portion of the opening door in the bevel gear system.

When the door D is opened, the tip of the rod (88) is released completely from the contacting condition on the body B of the automobile as shown in FIG. 19, and the rod (88) is shifted in the front side by means of the pull spring (90), and the arm (94) is inclined in the rear side to push the operating plate (93) in the rear side, and the small slide plate (107) is shifted in the rear side, and contacts the rear stopper (104) and stops. On the other hand, when the operating plate (93) is shifted backward, the pinion (108) is turned in the front side, and the bevel gear (111) is turned in the arrow mark direction and accordingly, the bevel gear (116) is turned in the arrow mark direction, and the shaft (115) interlocking with the bevel gear is turned in the lower direction, and while the stopper (119) engages with the lower surface of the front end portion of the opening portion (118) of the cylinder (112) as shown in FIG. 22, the cylinder (112) is turned downward by means of the stopper (119). The bevel gear (114) of the cylinder (112) is turned in the arrow mark direction, and the bevel gear 122 meshed with the bevel gear (114) is turned in the arrow mark direction so that the protector P is caused to turn around the surface side of the edge portion of the opening door D through the opening portion (25) of the side plate (24) of the rear side of the door D by resisting to the push spring (125), and the curved surface of the protector P covers the edge portion surface of the opening door D.

Furthermore, the operation of closing the door D will be described as follows. The push spring (125) of the protector P is operated by the closing operation of the door D, and the protector P is turned around and is accommodated in the reverse surface side of the door D through the opening portion (25) and the cylinder (112)

is turned upwardly by the push spring (125) through the bevel gears (122), (114), and the tip of the rod (88) contacts the body B of the automobile and the rod (88) is shifted in the rear side of the door D by resisting to the pull spring (90), the top end portion of the arm (94) pulls the operating plate (93) forward and the small slide plate (107) contacts the front stopper (103) of the rails (105), (105) and the slide plate (101) is shifted forward by resisting to the pull spring (102), and the slide plate (101) contacts the front stopper (98) of the lower rail (97) and stops, and the rear side of the shaft (115) is fitted into the cylinder (112). The pinion (108) is turned backward, and the bevel gear (111) is turned in the counter direction with the arrow mark, and the bevel gear (116) meshed with said gear is turned in the counter direction with the arrow mark, and the stopper (119) of the shaft (115) contacts the upper surface of the rear end portion of the opening portion (118) and stops and the accommodating operation of the protector P is completed.

Accordingly, the present invention is so constituted that in case the door D is opened, the protector P is completed.

Accordingly, the present invention is so constituted that in case the door D is opened, the protector P is caused to project and turn around the surface side of the edge portion of the opening door D to protect the edge portion surface of the opening door D so that the coating on the edge portion surface of the opening door D is protected from being spoiled by the impact or contact with the adjacent parked car, tree, wall, fence and similar objects, and also, when the automobile travels, and the door D is closed, the protector P is already turned and accommodated in the reverse surface side of the door D so that the appearance of the automobile equipped with the device of the present invention looks like ordinary automobiles.

What is claimed is:

1. In a device for protecting the outer surface of an automobile door comprising an operating mechanism and a protector mechanism provided within the door, said operating mechanism including an axially movable rod means having a terminal portion projecting from a hinged edge of the door to contact with an adjacent part of the body of the automobile and move axially during opening and closing of the door, and said protector mechanism including a pivotally mounted protector having a curved portion, and means connecting said protector with said operating mechanism for turning the protector around the free edge of the door during opening movements thereof in response to movement of said rod to guard the outer surface of the opening door, and for turning the protector back into the confines of the door during closing movements of the door, the improvement comprising a sliding member carried within said door, said protector being pivotally mounted on said sliding member and wherein said means for connecting said protector with said operating mechanism includes means for moving said sliding member towards said free edge of said door when the door is open prior to turning the protector around the free edge of the door and for moving said sliding member away from said free edge of the door when the door is closed subsequent to turning the protector back into the confines of the door.

2. The improvement of claim 1 wherein said means for moving said sliding member includes first spring means urging said sliding member towards said free edge of said door and said means connecting said protector with said operating mechanism includes linkage means between said operating mechanism and said sliding member for moving said sliding member away from said free edge against the action of said spring means during closing movements of the door and for releasing said sliding member during opening movements of the door to be urged by said spring means towards said free edge of the door.

3. The improvement of claim 2 wherein said linkage means includes a rack and pinion connected to said rod means whereby axial movement of said rod means effects rotary movement of said pinion through said rack, a first pulley associated with said pinion for rotation therewith, a second pulley associated with said sliding member and an elongated winding element connected between said pulleys said winding element being under tension when the door is closed to hold said sliding member away from said free edge of said door against the action of said first spring means and the tension in said winding member being relaxed by operation of said rack and pinion when the door is opened.

4. The improvement of claim 3 wherein said protector is mounted on said sliding member for rotation with said second pulley and the device includes second spring means acting between said sliding member and said protector and urging said protector to move around said free edge of said door, said second spring means having a smaller spring force than said first spring means and being opposed by tension in said winding member.

5. The improvement of claim 2 wherein said sliding member includes elongated slot means extending generally in the direction of the movement of said sliding member and wherein said linkage means includes lever means having one end pivotally connected to said rod means, the other end carrying a bearing member accommodated in said slot means and a fulcrum means intermediate said ends, said bearing member engaging an end wall defining said slot means when the door is closed to hold said sliding member away from said free edge of the door against the action of said first spring means and said lever means moving about said fulcrum means by the action of said rod means when the door is opened to move said bearing member and allow said first spring means to move said sliding member towards said free edge of the door.

6. The improvement of claim 5 including a pinion carried by said protector, an arm reciprocably mounted on said sliding member and including a rack portion meshing with said pinion, said arm having a pivotal connection with said lever means and a second spring means connected between said arm and said sliding member, said second spring means having a smaller spring force than said first spring means and during said arm towards a position in which said protector is turned back into the confines of the door, said lever means moving said arm when said door is opened against the action of said second spring means to turn the protector around the free edge of the door.

7. The improvement of claim 5 wherein said rod means includes a first rod member having a part constituting said terminal portion projecting from the hinged edge of the door and a second rod member connected to said lever means and wherein the device further includes pressure fluid operated piston and cylinder means for transmitting motion between said first and second rod members.

8. The improvement of claim 2 wherein said sliding member carries a rotational shaft terminating in a first bevel gear and said protector carries a second bevel gear meshing with said first bevel gear and wherein the device includes actuating means for rotating said shaft, said actuating means being associated with said linkage means and including rack and pinion means, a third bevel gear driven by said rack and pinion means and a fourth bevel gear on said shaft meshing with said third bevel gear.

* * * * *